（12) United States Patent
Berger et al.

(10) Patent No.: US 12,409,800 B2
(45) Date of Patent: Sep. 9, 2025

(54) BUMPER ARRANGEMENT FOR A MOTOR VEHICLE

(71) Applicant: BENTELER AUTOMOBILTECHNIK GMBH, Paderborn (DE)

(72) Inventors: Karl Kristian Berger, Gjovik (NO); Jens Chr. Haker, Gjovik (NO); Christian Handing, Langenberg (DE); Andreas Hitz, Erwitte (DE); Frode Paulsen, Gjovik (NO); Frank Rabe, Hiddenhausen (DE); Odd Perry Sovik, Kolbu (NO)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 529 days.

(21) Appl. No.: 17/590,427

(22) Filed: Feb. 1, 2022

(65) Prior Publication Data
US 2022/0242349 A1 Aug. 4, 2022

(30) Foreign Application Priority Data
Feb. 2, 2021 (DE) ..................... 10 2021 102 366.1

(51) Int. Cl.
B60R 19/12 (2006.01)
B60R 19/02 (2006.01)
B60R 19/34 (2006.01)

(52) U.S. Cl.
CPC ............ B60R 19/12 (2013.01); B60R 19/023 (2013.01); B60R 19/34 (2013.01)

(58) Field of Classification Search
CPC .................. B60R 19/34; B60R 19/023; B60R 2019/1813; B60R 19/18; B60R 19/12; B60R 2019/1806; B62D 25/085
(Continued)

(56) References Cited

U.S. PATENT DOCUMENTS 5,785,367 A * 7/1998 Baumann ............... B62D 21/15
293/133
6,428,065 B2 * 8/2002 Sato ........................ B60R 19/12
293/121
(Continued)

FOREIGN PATENT DOCUMENTS

DE 10154113 A1 5/2003
DE 102009058287 A1 6/2011
(Continued)

OTHER PUBLICATIONS

Office Action for German Application No. 10 2021 102 366.1 mailed Jan. 17, 2022; 18pp.
(Continued)

Primary Examiner — Jason S Morrow
(74) Attorney, Agent, or Firm — HAUPTMAN HAM, LLP

(57) ABSTRACT

A bumper arrangement for a motor vehicle, having an upper main crossmember, which is able to be coupled to the motor vehicle by way of crash boxes, and a lower auxiliary crossmember, wherein main crossmember and auxiliary crossmember are coupled to one another by way of vertical struts. The main crossmember and the auxiliary crossmember run so as to be curved about the vertical axis at least in certain portions, wherein main crossmember and auxiliary crossmember have different radii of curvature from one another, and/or in that the auxiliary crossmember is set back with respect to the main crossmember in a motor vehicle longitudinal direction in the direction directed toward the motor vehicle, and/or in that the auxiliary crossmember has a central portion which is offset in relation to the vertical direction.

16 Claims, 20 Drawing Sheets

(58) Field of Classification Search
USPC .................. 293/133; 296/193.09, 203.02
See application file for complete search history.

(56) References Cited

U.S. PATENT DOCUMENTS

| | | | |
|---|---|---|---|
| 7,735,902 B2* | 6/2010 | Wurtemberger | B62D 25/082 |
| | | | 293/133 |
| 11,046,268 B2* | 6/2021 | Bader | B60R 19/18 |
| 11,661,021 B2* | 5/2023 | Iwamoto | B60R 19/18 |
| | | | 293/102 |
| 12,024,106 B2* | 7/2024 | Günther | B60R 19/34 |
| 2010/0052342 A1 | 3/2010 | Wurtemberger | |
| 2011/0031769 A1* | 2/2011 | Loeffler | B60R 19/04 |
| | | | 293/146 |
| 2013/0187396 A1* | 7/2013 | Brockhoff | B60R 19/24 |
| | | | 293/146 |
| 2014/0216839 A1 | 8/2014 | Brockhoff et al. | |
| 2015/0336526 A1 | 11/2015 | Handing et al. | |
| 2022/0153215 A1 | 5/2022 | Paare et al. | |
| 2023/0010241 A1* | 1/2023 | Wada | B60R 19/18 |
| 2023/0047814 A1* | 2/2023 | Mueller | B60R 19/18 |

FOREIGN PATENT DOCUMENTS

| | | |
|---|---|---|
| DE | 102012019933 A1 | 4/2014 |
| DE | 102012211339 A1 | 4/2014 |
| DE | 102013101085 A1 | 8/2014 |
| DE | 102017124590 A1 | 4/2019 |
| DE | 202020005403 U1 | 2/2021 |
| DE | 202021103263 U1 | 6/2021 |
| DE | 202021103264 U1 | 6/2021 |
| EP | 4001022 A1 | 5/2022 |
| FR | 2932766 A1 | 12/2009 |

OTHER PUBLICATIONS

Extended European Search Report for European Application No. 22153426.6 mailed Jun. 7, 2022; 16pp.
Examination Report for Chinese application No. 202210109517.9 mailed May 23, 2024; 17pp.

* cited by examiner

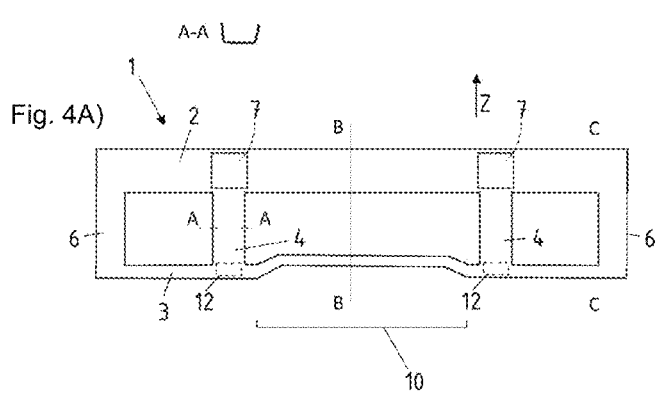
Fig. 4D)
Fig. 4A)
Fig. 4B)
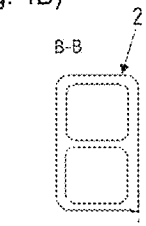
Fig. 4C)
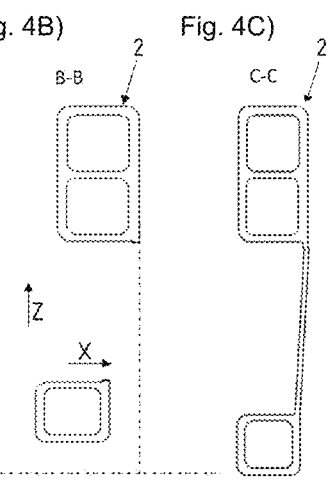

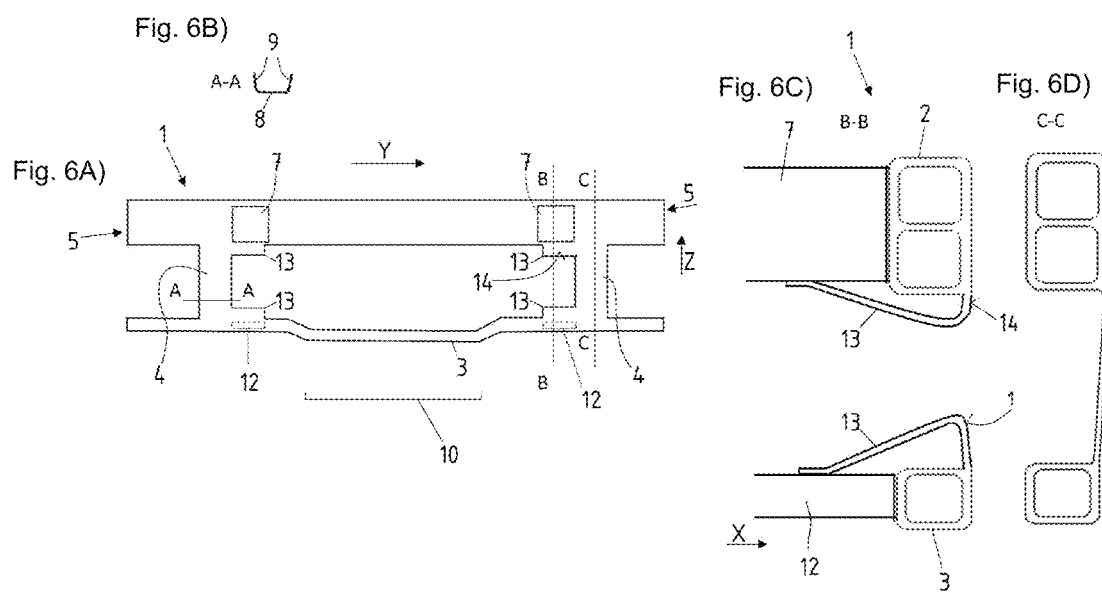

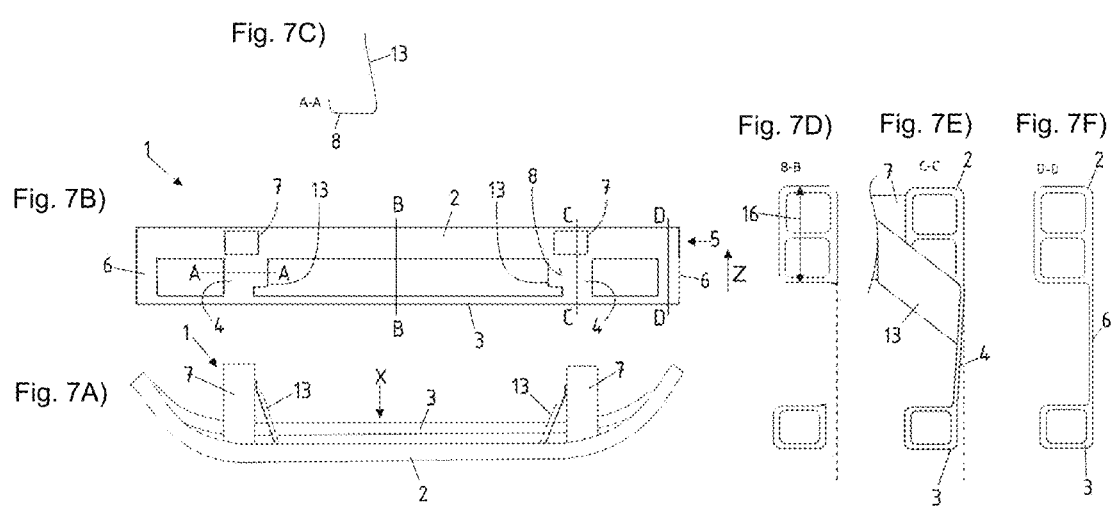

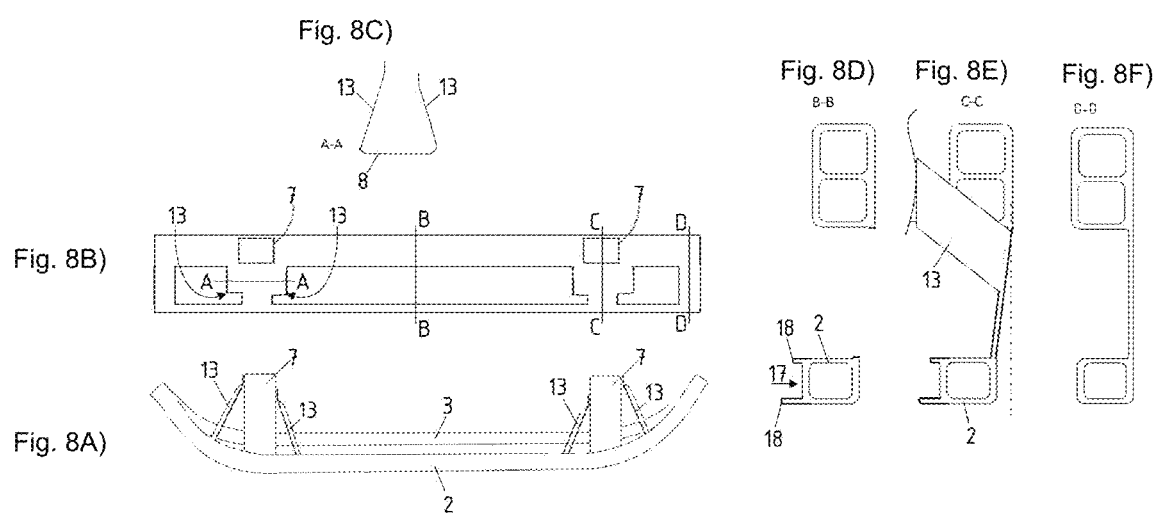

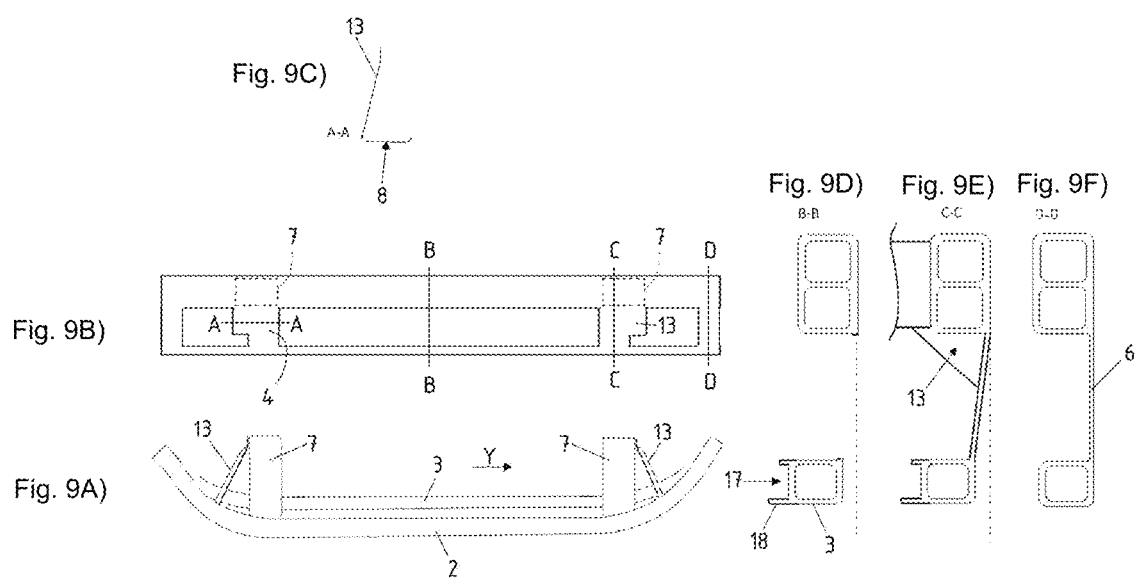

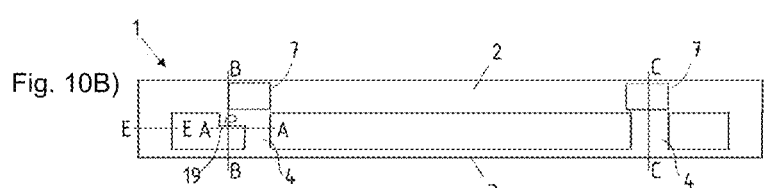
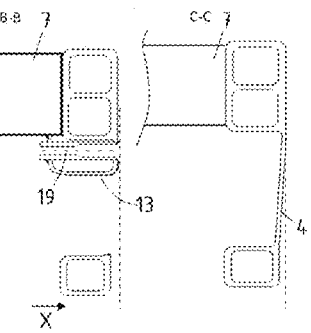
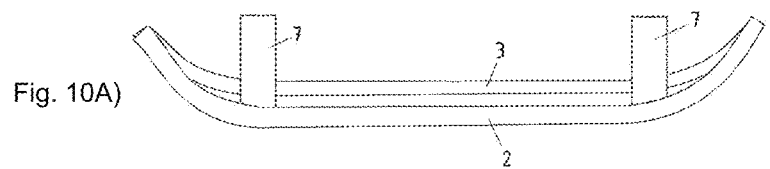

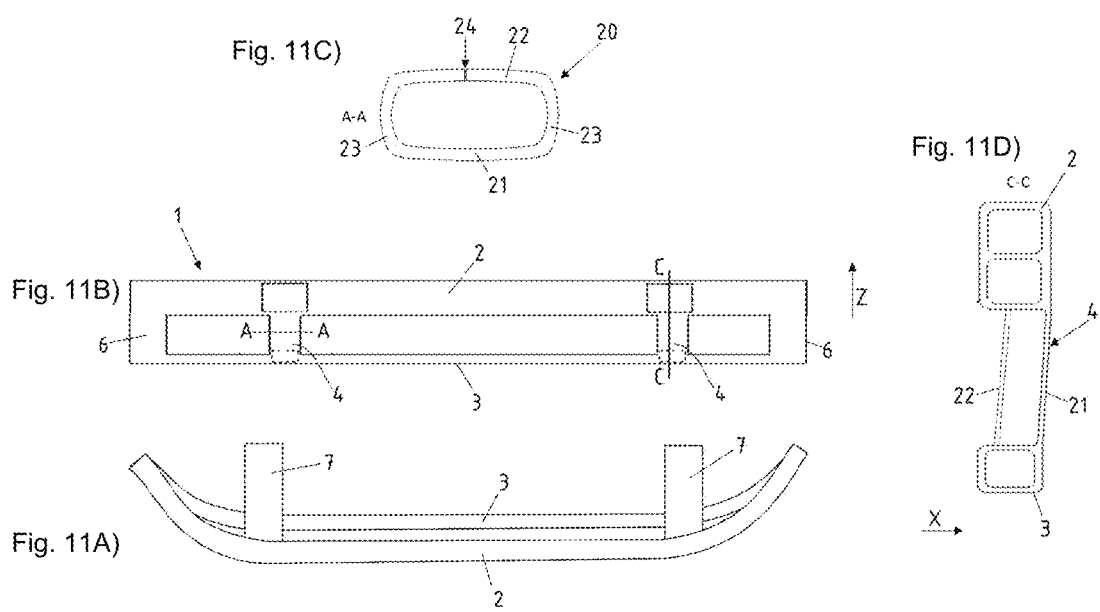

Fig. 12C)
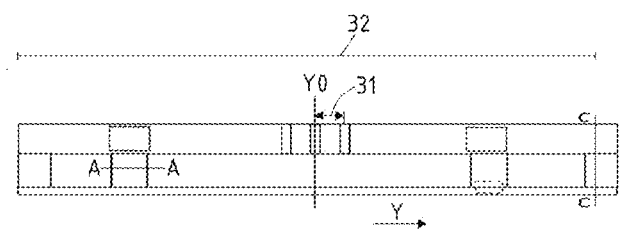
Fig. 12B)
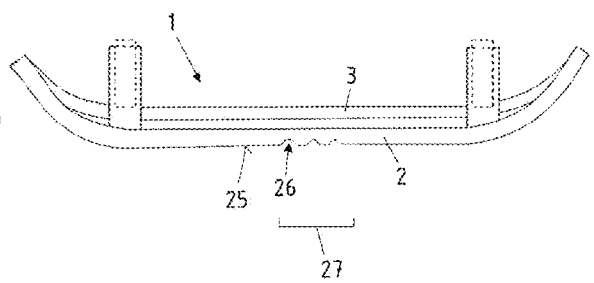
Fig. 12A)
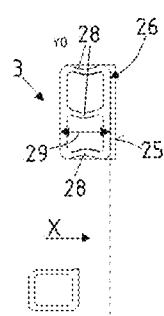
Fig. 12D)
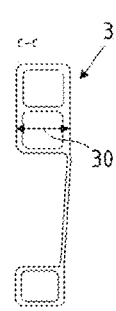
Fig. 12E)

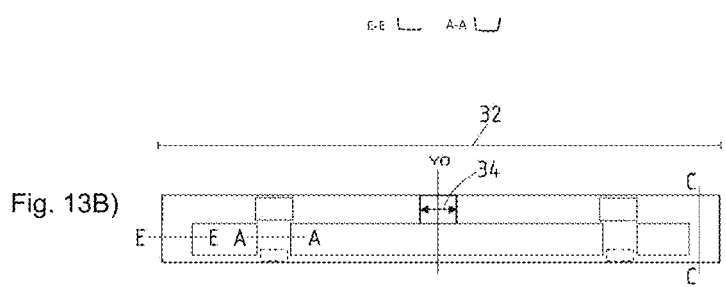
Fig. 13C) Fig. 13D)
Fig. 13B)
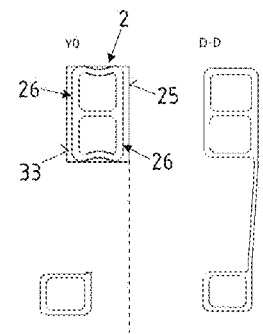
Fig. 13E) Fig. 13F)
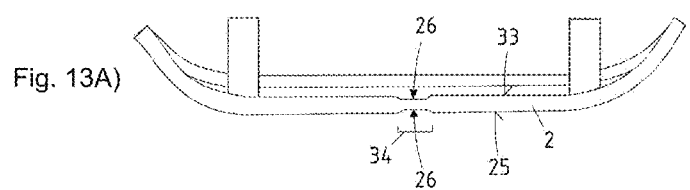
Fig. 13A)

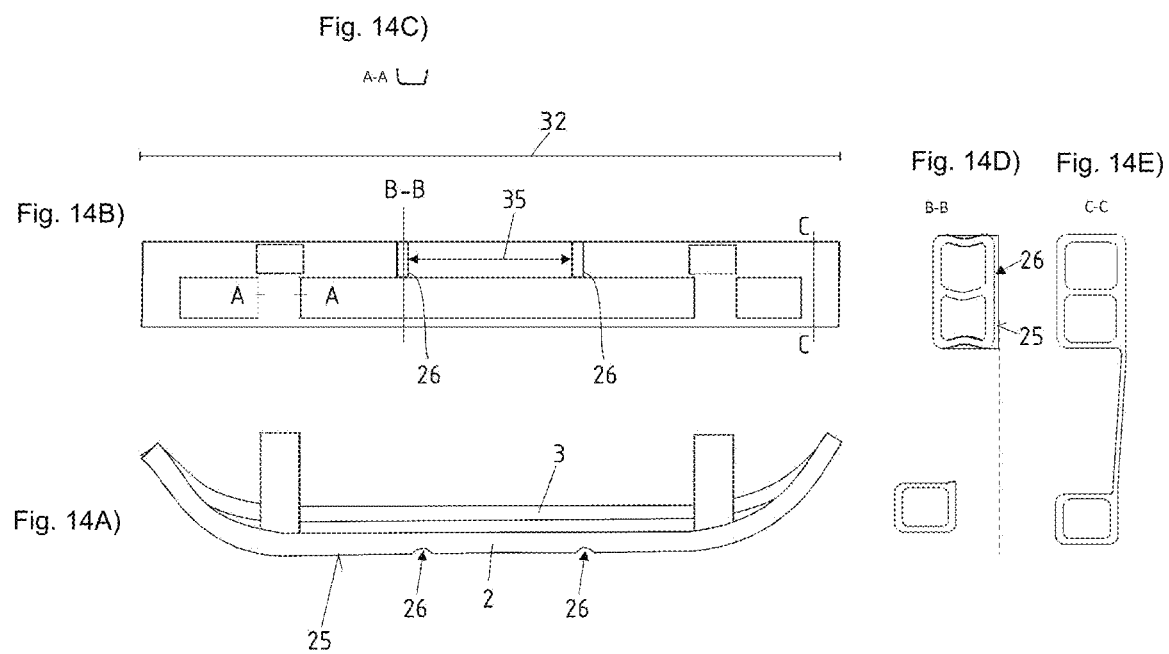

Fig. 15C) Fig. 15D)
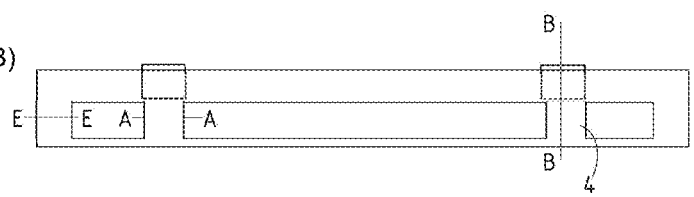
Fig. 15B)
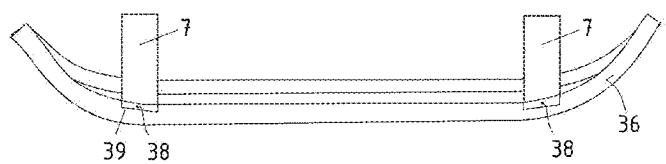
Fig. 15A)
Fig. 15E)
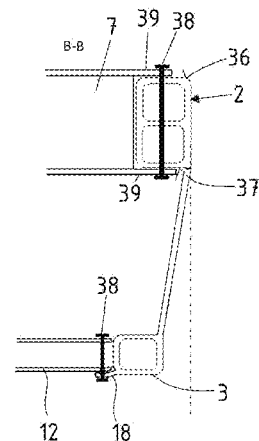

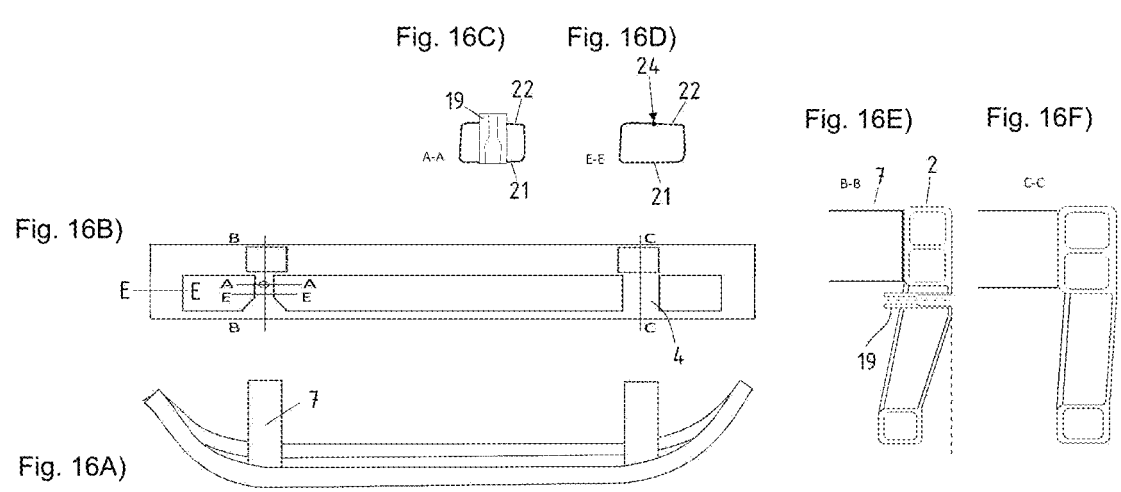

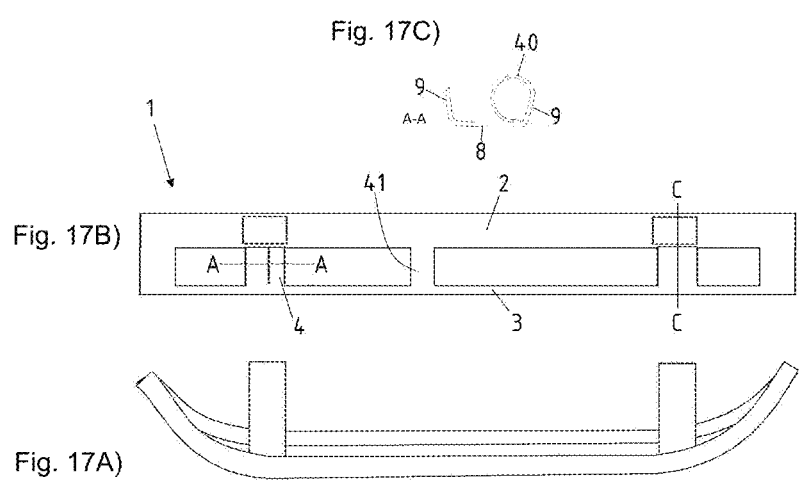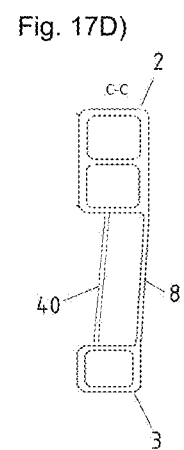

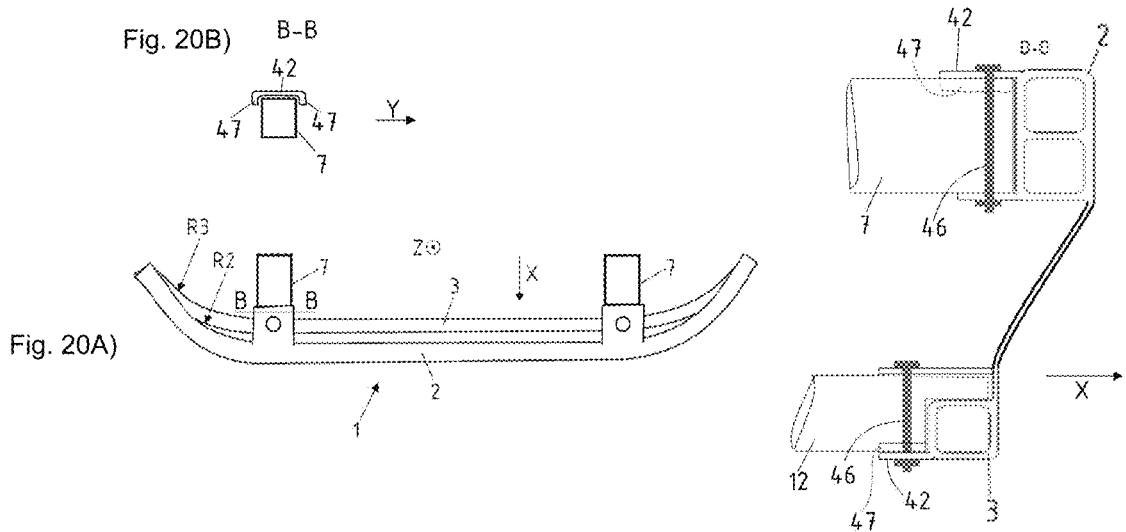

BUMPER ARRANGEMENT FOR A MOTOR VEHICLE

RELATED APPLICATIONS

The present application claims priority of German Application Number 10 2021 102 366.1 filed Feb. 2, 2021, the disclosure of which is hereby incorporated by reference herein in its entirety.

FIELD

The present disclosure relates to a bumper arrangement for a motor vehicle according to the features in the preamble of Claim 1.

BACKGROUND

Motor vehicles have bumper arrangements at the front and end. In the event of a vehicle crash or a rear-end collision or even an impact against an object, two tasks are fulfilled by such a bumper arrangement. Firstly, there is a crossmember. The crossmember is sufficiently rigid to prevent a corresponding object or a motor vehicle from penetrating to too great an extent into the front or end region. Consequently, a possibly punctiform impact, for example against a post, is transmitted by the crossmember to a large portion of the motor vehicle width.

A second task which is fulfilled by a bumper arrangement is the conversion of crash energy into deformation work and a corresponding dissipation/absorption of the impact energy as a result. For this purpose, a respective crossmember is coupled to the motor vehicle by way of crash boxes. For this purpose, the crash boxes are arranged between a central region and an end region of the crossmember in relation to the motor vehicle transverse direction. The crash boxes are then generally coupled to longitudinal members of the motor vehicle. In the event of an impact, the crash boxes fold, for example, in the manner of a concertina and thus convert crash energy into deformation work.

SUMMARY

An object of the present disclosure relates to a bumper arrangement which has improved crash behavior, for example, for the MPDB crash test.

The aforementioned object is achieved according to the disclosure by means of a bumper arrangement for a motor vehicle, having the features in Claim 1.

The bumper arrangement for a motor vehicle has an upper main crossmember, which is able to be coupled to the motor vehicle by way of crash boxes, and a lower auxiliary crossmember. The main crossmember and the auxiliary crossmember are coupled to one another by way of vertical struts. The auxiliary crossmember is able to be supported on the crash boxes. The auxiliary crossmember is able to be supported on the motor vehicle by way of separate lower crash supports.

According to the disclosure, the bumper arrangement is distinguished in that the main crossmember and the auxiliary crossmember run so as to be curved about the vertical axis at least in certain portions, wherein the main crossmember and the auxiliary crossmember are able to have different radii of curvature from one another.

This is combined with an offset of the auxiliary crossmember in a motor vehicle longitudinal direction in the direction toward the vehicle. In the case of a bumper arrangement arranged at the front of a vehicle, the auxiliary crossmember is thus completely or partially arranged so as to be offset toward the rear or the front in the motor vehicle longitudinal direction.

In some embodiments of the disclosure, the auxiliary crossmember has a central portion which is offset in relation to the vertical direction, such as in an upward or downward direction. The main crossmember is able to have a central portion which has an offset in the vertical direction, and consequently in the X direction of the motor vehicle. This is able to be formed in addition to the offset of the auxiliary crossmember in the vertical direction. The main crossmember alone is able to have an offset in the motor vehicle vertical direction, and for the auxiliary crossmember to run in a planar manner in relation to the motor vehicle vertical direction. As a result of the aforementioned measures, the disclosure achieves a situation whereby a head-on crash with lateral overlap is distributed to the main crossmember and also the auxiliary crossmember. The intrusion forces into the vehicle front are thus distributed in an improved manner.

The possibilities which result from the curvatures of the main crossmember and the auxiliary crossmember or which result from the offset of the auxiliary crossmember relative to the main crossmember in the motor vehicle longitudinal direction allow the desired crash reactions with regard to the dissipation of energy to be adjusted according to the requirements of the respective motor vehicle class equipped with the bumper arrangement, such that the crash performance which is respectively required on the part of the manufacturer and in statutory terms is achieved.

The main crossmember and the auxiliary crossmember, in combination with the vertical struts, are produced in one piece and in a materially integral manner. To this end, within the context of the disclosure, the bumper arrangement is able to be produced in the form of a press-formed component, for example, from a steel alloy. This is thus a shell component which is produced by forming from a blank. The main crossmember and the auxiliary crossmember have a profiled U-shaped or C-shaped or even hat-shaped, cross section. Optionally, a respective closing panel is able to be placed on the main crossmember or auxiliary crossmember in relation to the longitudinal direction, possibly also only in certain portions.

In some embodiments of the disclosure, the main crossmember and the auxiliary crossmember are able to be produced in one piece and in a materially integral manner from an extruded profile, for example, from a light metal alloy. To this end, a profile which has a plurality of hollow chambers is able to be extruded, which are connected by way of a web, and which is compact in cross section. This is then processed by forming and cutting so as to form a main crossmember which is arranged at the top in relation to the vertical direction and an auxiliary crossmember which is arranged below said main crossmember. The corresponding curvatures are able to be produced by a further processing by bending. The connections formed by way of the vertical struts is a connecting web which remains between the profiles. The rest of the material is able to be removed by cutting.

The vertical struts for their part have a profiled, U-shaped, C-shaped or hat-shaped, cross section. A front web is able to be arranged so as to point away from the vehicle. This measure has the effect that the main crossmember and the auxiliary crossmember are coupled to one another in a rigid manner, which in turn increases the crash performance.

In some embodiments of the disclosure, there is an indentation in the main crossmember, in such a way that an initial deformation takes place in the case of loading in the longitudinal direction. The indentation is provided on a front wall of the main crossmember in relation to the motor vehicle longitudinal axis. Two or more indentations are also able to be present. The two indentations are spaced apart from one another in the motor vehicle transverse direction. However, the two indentations are arranged symmetrically to one another in relation to a central plane in the motor vehicle transverse direction. As a result of the indentation or indentations on the front side, an initial deformation is able to take place, such that the bumper arrangement correspondingly deforms in each case only over one half in relation to the motor vehicle transverse direction. An initial introduction of force, thus the initial impact force, is able to dissipate a first peak of crash energy by causing an inherent deformation of the main crossmember.

The auxiliary crossmember is coupled to lower crash support elements. As an alternative or in addition, the auxiliary crossmember is coupled to additional longitudinal members or crash boxes, which in turn are supported on the motor vehicle. The auxiliary crossmember thus provides a further load path which in turn introduces the forces occurring in the case of a head-on impact in a more uniform manner, and thus to a respectively locally lower extent, into the motor vehicle, which in turn increases the overall crash performance.

To further improve the crash behavior, at least one additional support element is arranged on the main crossmember and/or the auxiliary crossmember, wherein the support element additionally supports the main crossmember and/or the auxiliary crossmember on the crash box or a lower crash support.

For this purpose, the support element is formed in one piece with the main crossmember and/or the auxiliary crossmember in a materially integral manner. By way of a corresponding processing by bending, the support element then points in the motor vehicle longitudinal direction in relation to the main crossmember and/or auxiliary crossmember so as to be oriented toward the rear, and is supported on the crash box. This support takes place to the side of or below or above the crash box or on a longitudinal member of the motor vehicle.

The one additional support element is able to distribute the longitudinal forces occurring in the event of a head-on crash to a plurality of load paths, which in turn increases the crash performance of the bumper arrangement according to the disclosure.

BRIEF DESCRIPTION OF THE DRAWINGS

The following description provides further advantages, features, characteristics and aspects of the present disclosure. Design variants are represented in schematic figures.

Said figures serve for ease of understanding of the disclosure. In the figures:

FIG. 4A-FIG. 4D show a second design variant in a front view and cross-sectional views according to the disclosure, FIG. 6A-FIG. 6D show a third design variant in a front view and cross-sectional views according to the disclosure, FIG. 7A-FIG. 7F show a fourth design variant in a plan view, front view and cross-sectional views according to the disclosure, FIG. 8A-FIG. 8F show a fifth design variant in a plan view, front view and cross-sectional views according to the disclosure, FIG. 9A-FIG. 9F show a sixth design variant in a plan view, front view and cross-sectional views according to the disclosure, FIG. 10A-FIG. 10F show a seventh design variant in a plan view, front view and cross-sectional views according to the disclosure, FIG. 11A-FIG. 11D show an eighth design variant in a plan view, front view and cross-sectional views according to the disclosure, FIG. 12A-FIG. 12E show a ninth design variant in a plan view, front view and cross-sectional views according to the disclosure, FIG. 13A-FIG. 13F show a tenth design variant in a plan view, front view and cross-sectional views according to the disclosure, FIG. 14A-FIG. 14E show an eleventh design variant in a plan view, front view and cross-sectional views according to the disclosure, FIG. 15A-FIG. 15E show a twelfth design variant in a plan view, front view and cross-sectional views according to the disclosure, FIG. 16A-FIG. 16F show a thirteenth design variant in a plan view, front view and cross-sectional views according to the disclosure, and FIG. 17A-FIG. 17D show a fourteenth design variant in a plan view, front view and cross-sectional views according to the disclosure, FIG. 20A-FIG. 20C show a seventeenth design variant in a plan view and cross-sectional views according to the disclosure.

DETAILED DESCRIPTION

In the figures, the same reference designations are used for identical or similar components, even if a repeated description is omitted for the sake of simplicity.

Figure 1:
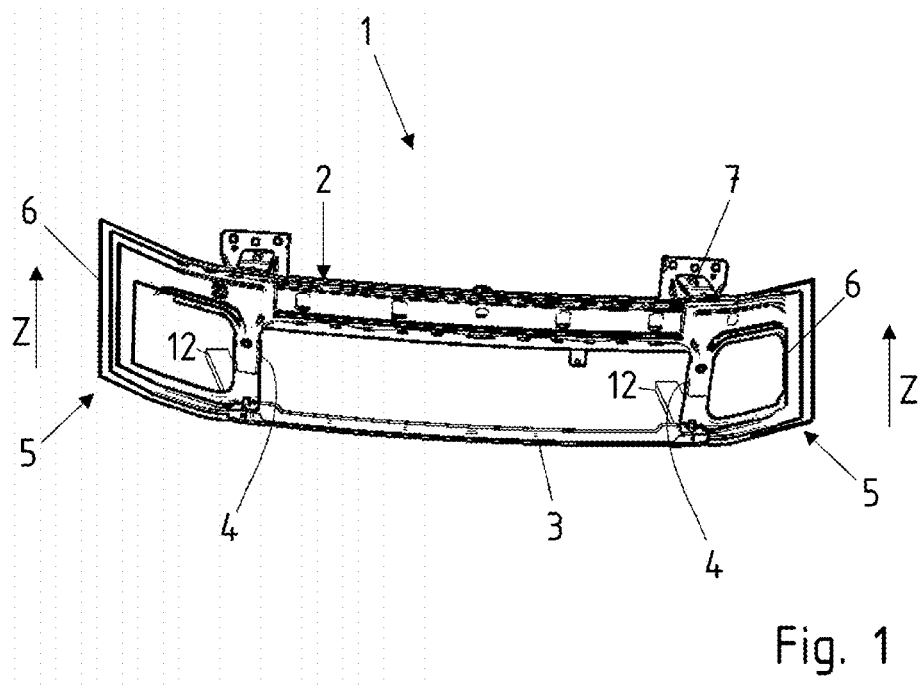
FIG. 1 shows a perspective illustration of a bumper arrangement according to the disclosure.
Figure 2:
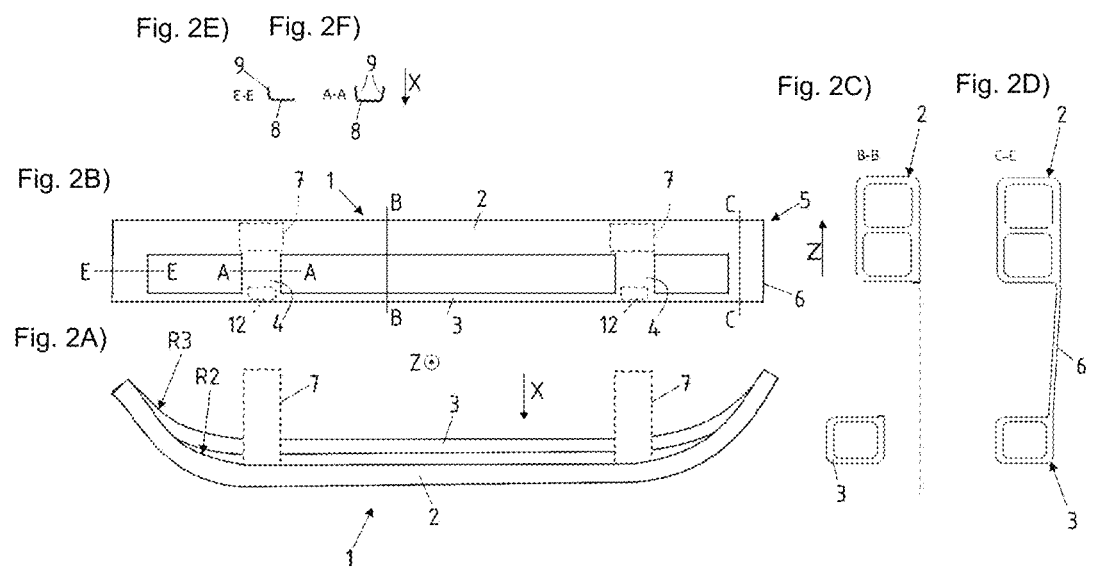
FIG. 2A-FIG. 2F show a first design variant according to the disclosure of a bumper arrangement according to the disclosure in a plan view, front view and various sectional views.

FIG. 1 shows a bumper arrangement 1 according to the disclosure for a motor vehicle (not illustrated in any more detail). The bumper arrangement 1 has an upper main crossmember 2 and an auxiliary crossmember 3 located below said main crossmember in relation to the motor vehicle vertical direction Z. The main crossmember 2 and the auxiliary crossmember 3 are coupled to one another by way of vertical struts 4, 6. A vertical element 6 which also connects the main and auxiliary crossmembers 2, 3 is provided in the respective end regions 5. The main crossmember 2 is coupled to the motor vehicle (not illustrated in any more detail) by way of crash boxes 7. The vertical struts 4 are able to be supported on the crash boxes 7, which is not illustrated in any more detail. The auxiliary crossmember 3 is supported on the motor vehicle by way of lower crash supports 12.

FIG. 2A-FIG. 2F show a design variant of the present disclosure. The bumper arrangement 1 according to the disclosure is illustrated with main crossmember 2 arranged at the top and auxiliary crossmember 3 arranged below said main crossmember in relation to the vertical direction. The main crossmember 2 is coupled to the motor vehicle (not illustrated in any more detail) by way of crash boxes 7. For example, the crash boxes 7 are coupled to the front side of a respective longitudinal member (not illustrated in any more detail) of the motor vehicle. The auxiliary crossmember 3 is supported on the motor vehicle by way of lower crash supports 12.

According to FIG. 2A, the auxiliary crossmember 3 arranged at the bottom in the motor vehicle vertical direction Z is formed so as to be set back with respect to the main crossmember 2 in the motor vehicle longitudinal direction X at least over a large part of the central portion, thus between the crash boxes 7, and possibly also in the respective edge region. In the case of an impact, contact with the main crossmember 2 thus initially takes place. After deformation of the main crossmember 2, an additional deformation of the auxiliary crossmember 3 then also takes place. According to FIG. 2A, the respective radius of curvature with which the main crossmember 2 and auxiliary crossmember 3 runs so as to be curved about the vertical axis Z differs from one another. In this case, the radius of curvature of the main crossmember 2 is smaller than the radius of curvature of the auxiliary crossmember 3. This means that the main crossmember 2 is curved to a more pronounced extent than the radius of curvature of the auxiliary crossmember 3. In cooperation with the offset of the auxiliary crossmember 3 in relation to the motor vehicle longitudinal direction in the direction toward the vehicle, different radii of curvature is able to also be used to first of all ensure that a barrier or pressing-on object initially strikes against the main crossmember 2 and only later strikes against the auxiliary crossmember 3. The main crossmember 2 and the auxiliary crossmember 3 are coupled to one another by way of the respective vertical strut 4. A cross section along section line A-A of the vertical strut 4 is shown in FIG. 2F. Said strut is U-shaped in cross section. A front web 8 is directed away from the motor vehicle. Limbs 9 bent from the web 8 are oriented toward the rear. The vertical strut 4 is thus stiffened. An impact with an object initially occurs on account of the forwardly directed web 8. Furthermore, vertical elements 6 are also arranged in the respective end region. A section through the vertical elements 6 along section line E-E is shown in FIG. 2E. The vertical element 6 itself is L-shaped in cross section, with a forwardly directed web 8 and a limb 9 bent therefrom toward the rear also being formed here.

In this case, the web 8 also initially strikes against an impacting object or a barrier. In this case, the crash boxes 7 are arranged above the vertical struts 4 in the motor vehicle vertical direction. In addition, a vertical section along section line B-B is illustrated in FIG. 2C. The main crossmember 2 is illustrated as a two-chamber hollow profile, and the auxiliary crossmember 3 as a one-chamber hollow profile. Furthermore, the end region 5 is illustrated in FIG. 2D along section line C-C, according to which the main crossmember 2 and the auxiliary crossmember 3 are coupled to one another by way of a vertical element 6. The vertical element 6 is produced in one piece with the main crossmember 2 and the auxiliary crossmember 3 in a materially integral manner, for example by an extrusion process from a light metal alloy, specifically an aluminum alloy. The web 8 which is not present in FIG. 2C along section line B-B or the vertical element 6 has then been removed by cutting.

Figure 3:
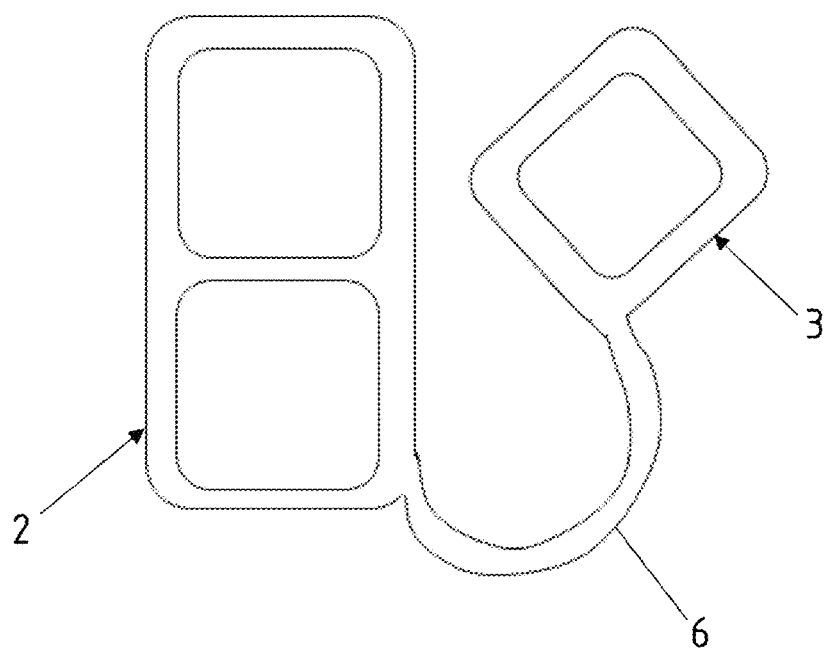
FIG. 3 shows a cross-sectional view through an extruded profile according to the disclosure.

FIG. 3 shows such an extruded profile in cross section. A two-chamber hollow profile for forming the subsequent main crossmember 2 and a one-chamber hollow profile for forming the subsequent auxiliary crossmember 3 are coupled to one another by way of a vertical element 6. In a forming step (not illustrated in any more detail), the extruded profile initially produced in this way is then first of all machined by forming or by bending in such a way to be flattened so that the main crossmember 2 is arranged above in relation to the vertical direction and the auxiliary crossmember 3 is arranged below said main crossmember oriented in the vertical direction, and the web 8 forms the vertical element. Initially, however, a compact profile is able to be extruded in cross section.

FIG. 4A-FIG. 4D show a design variant analogous to FIG. 2A-FIG. 2F. Here, however, the special feature is provided that a central portion 10 of the auxiliary crossmember 3 is offset toward the top in the vertical direction. This offset compensates a height difference depending on crash-related requirements, for example in order to achieve a bumper-to-bumper test or else a pedestrian impact test which is additionally to be performed. Corresponding air guides for cooling elements are able to be used, or the like, which are located therebehind and which are not illustrated in any more detail.

According to FIG. 4B and FIG. 4C, the auxiliary crossmember 3 arranged at the bottom in the motor vehicle vertical direction Z has, in the central portion, an offset toward the top with respect to the main crossmember 2 in relation to the vertical direction. Furthermore, as already seen in FIG. 2F, the auxiliary crossmember 3 is able to have an offset toward the rear in relation to the motor vehicle longitudinal direction X. This offset does not have to be formed, however, the offset is able to be formed only in the middle portion on its own. This relates to the height offset in the motor vehicle vertical direction, which would then be formed without an offset in the motor vehicle longitudinal direction.

Figure 5:
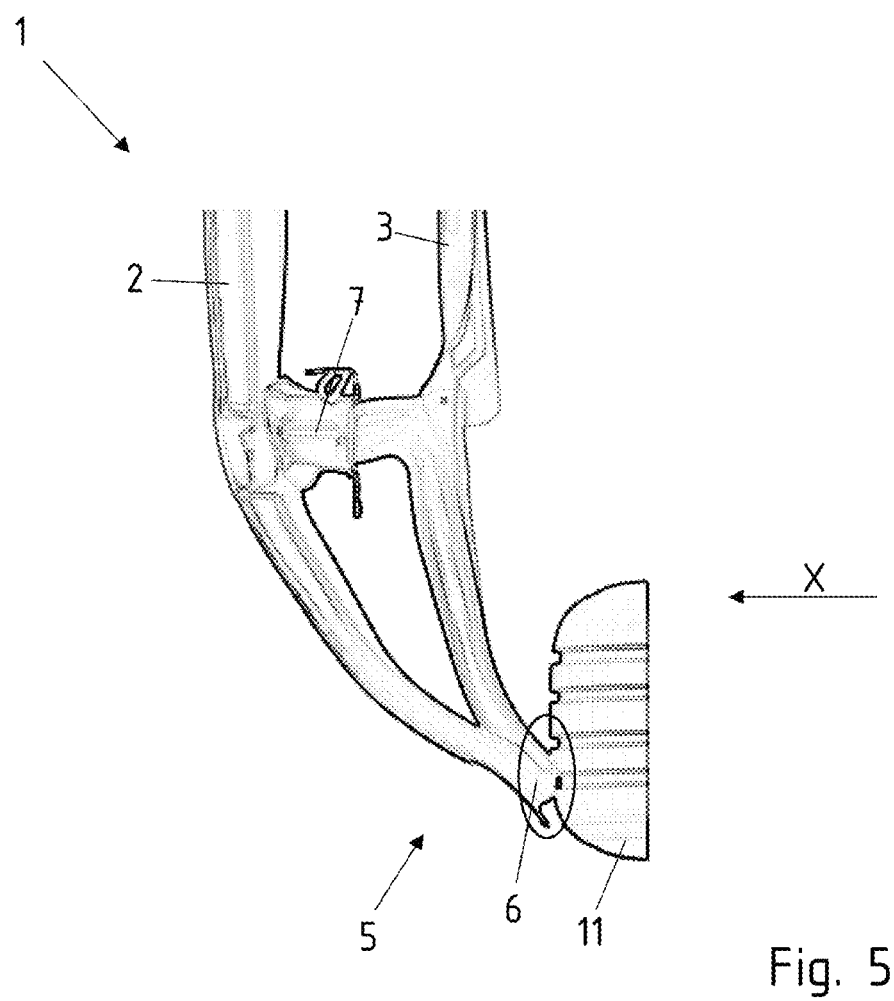
FIG. 5 shows a crash scenario of a bumper arrangement according to the disclosure in a plan view.

FIG. 5 shows the bumper arrangement 1 in a view from above when a crash has already occurred. The crash box 7 has already been compressed. The main crossmember 2 arranged at the top and the auxiliary crossmember 3 located below said main crossmember in the vertical direction are arranged further down. The vertical element 6 in the end region 5 has been moved toward a wheel 11 in relation to the motor vehicle longitudinal direction. Said vertical element is now supported by way of its bent limb according to FIG. 2E, on a wheel 11. Contact is able to also initially be made with a wheel arch (not illustrated in any more detail). A further load path via the wheel 11 and, following behind in the wheel 11 in the motor vehicle longitudinal direction, a rocker panel (not illustrated in any more detail) would thus be produced. Thus, if no lower crash boxes are present, the main crossmember 2 is introduced into the motor vehicle body not only exclusively via the crash box 7 but also via a second load path, thus via the wheel 11 and the rocker panel located behind the wheel 11, in the motor vehicle longitudinal direction. A support surface is produced by the vertical element 6, with the result that the wheel 11 is struck in the motor vehicle longitudinal direction, and movement under or over the wheel 11 due to the rotational connection of the wheel lithe crash energy is reliably prevented. A large impact surface of the vertical element 6, in conjunction with the main and auxiliary crossmembers 2, 3, in relation to the motor vehicle vertical direction ensures reliable support on the wheel 11. A situation whereby the bumper arrangement 1, for example in the case of only the main crossmember 2, is lifted above the wheel 11 to correspondingly not be provided with any additional support by the wheel 11, is thus avoided.

FIG. 6A-FIG. 6D show an alternative design variant with a bumper arrangement 1 according to the disclosure. This is able to constitute an independent concept of the disclosure, but is able to be applied in combination with one or more of the exemplary embodiments according to FIG. 1-FIG. 5.

FIG. 6A shows a bumper arrangement 1 which likewise has a main crossmember 2 and an auxiliary crossmember 3 arranged below said main crossmember in the motor vehicle vertical direction Z. A central portion of the auxiliary crossmember 3 is able to be arranged so as to be offset toward the bottom in the vertical direction Z, but is able to be arranged so as to be offset toward the top (not illustrated). The main crossmember 2 and the auxiliary crossmember 3 are coupled to one another in each case by way of vertical struts 4. In this exemplary embodiment, the respective end regions 5 of the main crossmember 2 and the auxiliary crossmember 3 are not separately coupled to one another by way of a vertical elements 6 again. This is, however, a possible configuration, but is not illustrated.

However, the crash boxes 7, which are indicated by the dashed lines and to which the main crossmember 2 is fastened, are arranged so as to be inwardly offset in the motor vehicle transverse direction Y, thus inwardly offset next to the vertical struts 4. In addition, the auxiliary crossmember 3 is supported in the motor vehicle longitudinal direction by way of a respective additional crash box 12, which is also shown in cross section in FIG. 6C. According to FIG. 6B, the vertical strut 4 also has a U-shaped cross section, with a forwardly directed web 8 and the limbs 9 bent therefrom.

In the design variant of FIG. 6A-FIG. 6D, a respective additional support element 13 is present on the main crossmember 2, and also optionally, as illustrated here, an additional support element 13 is present on the auxiliary crossmember 3. This additional support element 13 is a piece of material which is formed in one piece with the main crossmember 2 and/or auxiliary crossmember 3 in a materially integral manner and which is averted in the form of a kind of brace by bending and which, in the case of FIG. 6C for the main crossmember 2, is arranged below, and connected to, the crash box 7. In the case of the auxiliary crossmember 3, said support element is bent upward and rearward and is thus coupled to the additional crash box 12. This effects an additional supporting action, but also enlarges the impact surface on the front sides 14, 15 of the main crossmember 2 and the auxiliary crossmember 3.

FIG. 7A-FIG. 7F show a further alternative design variant of the present disclosure.

Alternative design variant of the disclosure that is able to be combined as desired in supplementary fashion with the aforementioned examples. FIG. 7A and FIG. 7B disclose a bumper arrangement 1 which has a main crossmember 2 and an auxiliary crossmember 3. According to the plan view of FIG. 7A, the auxiliary crossmember 3 is arranged so as to be offset toward the rear in the motor vehicle longitudinal direction with respect to the main crossmember 2. The main crossmember 2 is supported on a motor vehicle (not illustrated in any more detail) by way of crash boxes 7. Vertical struts 4 are present which connect the main crossmember 2 and the auxiliary crossmember 3 to one another. These vertical struts 4 are for their part produced in one piece with the main crossmember 2 and the auxiliary crossmember 3 in a materially integral manner in the form of an extruded component. Vertical elements 6 which connect the main crossmember 2 and the auxiliary crossmember 3 to one another are also arranged in the end region 5 of the main crossmember 2 and the auxiliary crossmember 3. The main crossmember 2 itself is in the form of a two-chamber hollow profile, and the auxiliary crossmember 3 is in the form of a one-chamber hollow profile. The vertical strut 4 and the vertical element 6 are formed in one piece with the main crossmember 2 and the auxiliary crossmember 3 in a materially integral manner.

The adaptation relative to the embodiments described above involves the vertical strut 4 being formed in each case with an additional portion of material, such that a considerably wider, forwardly directed web 8 is produced at the vertical strut 4 as per section line A-A. A limb bent toward the rear is able to be regarded as an additional support element 13. This additional support element 13 is then laterally supported on, and connected to, the crash box 7 located the additional support element 13, illustrated in FIG. 7A. For this purpose, the additional support element 13 as per FIG. 7E, is able to be bent upward so as to be offset in the motor vehicle vertical direction Z in order to then also be laterally supported on the crash box 7. In another embodiment, the crash box 7 extends beyond the actual height of the main crossmember 2 in relation to the height in the motor vehicle vertical direction Z, and thus, downward in the motor vehicle vertical direction Z, the height of the crash box 7 or the arrangement of the crash box 7 has a further extent in the motor vehicle vertical direction Z. The additional support element 13, which is supported laterally on the crash box 7, is thus only bent laterally and not also bent upward in the motor vehicle vertical direction, as is illustrated in FIG. 7E.

FIG. 8A-FIG. 8F show a further design variant of the disclosure. Said design variant is based substantially on the design variant described in FIG. 7A-FIG. 7F. However, the additional support is implemented not only on one side of a respective crash box 7 but on both sides of the crash box 7. There is thus a considerably wider web 8 as per section line A-A illustrated in FIG. 8C, and support is effected on both sides of the crash box 7 in each case. FIG. 8A-FIG. 8F additionally shows that projecting stiffening webs are present on the rear side of the auxiliary crossmember 2. These stiffening webs projecting on the rear side generate an increased moment of resistance to bending about the motor vehicle vertical direction. Consequently, the auxiliary crossmember 2 has a higher stiffness owing to the stiffening webs.

FIG. 9A-FIG. 9F show an alternative design variant to FIG. 7A-FIG. 7F. Here, a number of additional support elements are present, which are supported on the crash boxes 7. Said additional support elements are supported on the outer side of the crash boxes 7 in the motor vehicle transverse direction. According to the examples in FIG. 7A-FIG. 7F, said additional support elements are supported on the inner side of the crash boxes 7. This also initially produces a larger web 8 for a vertical element 6 according to FIG. 9B and FIG. 9C. According to FIG. 9A-FIG. 9F, the additional support stiffens the outer end, which is outwardly prevented from any additional buckling or kinking in the direction of the motor vehicle transverse direction on account of the oblique support. Here, too, the additional stiffening webs are optionally arranged on the rear side of the auxiliary crossmember 3.

FIG. 10A-FIG. 10F show a further alternative or additional design variant of the present disclosure. Here, the bumper arrangement 1 is again formed with a main crossmember 2 and an auxiliary crossmember 3. These two crossmembers are coupled to one another by way of vertical struts 4. According to the design variant, a towing eye 19 is arranged in an additional support element 13. As per section line B-B, illustrated in FIG. 10E, this arrangement is effected outside of the crash box 7 and outside of the main crossmember 2. According to the disclosure, this entails that both the main crossmember 2 and the crash box 7 are able to correspondingly deform in the event of a head-on crash, without the towing eye 19 having an adverse effect on the deformation itself. The towing eye 19 is thus arranged separately from the impact bar and the crash box 7. For this purpose, when a main crossmember 2 and auxiliary crossmember 3 are blanks, a part of the connecting vertical element 6 according to FIG. 10F, section line C-C, is able to be used and processed by cutting and by bending so that the additional portion element is formed, which is then bent toward the rear in the motor vehicle longitudinal direction in order to provide an additional receiving chamber into which a towing eye 19 is then introduced. The towing eye 19 is able to be welded in the chamber, for example. However, the towing eye 19 is arranged outside of the crash box 7 and outside of the main crossmember 2 so as to not have any effect on the crash performance of the main crossmember 2 and the crash box 7.

FIG. 11A-FIG. 11D show a further additional and alternative design variant of the present disclosure.

Here, again, a bumper arrangement 1 having a main crossmember 2 and an auxiliary crossmember 3 which are coupled to one another by way of vertical struts 4 is illustrated. Here, however, the vertical struts 4 are in the form of a hollow profile 20 which has an intrinsically closed form in cross section, as per section line A-A. These then have a front wall 21 and a rear wall 22, and also webs 23 connecting the front wall and the rear wall. This is produced by first of all producing the main crossmember 2 and the auxiliary crossmember 3 together in the form of a one-piece extruded profile, as per section line C-C illustrated FIG. 11D. The connection between the main crossmember 2 and the auxiliary crossmember 3, said connection forming the front wall 22 of the vertical strut 4, is then cut by cutting. Said connection is then bent toward the rear in relation to the motor vehicle longitudinal direction X in order to form the connecting webs 23, and closed so as to be oriented pointing toward one another at the rear wall 22. Welding is able to be carried out at the joint point 24 in order to give rise to additional stiffening. What is achieved by forming a hollow profile 20 as the vertical strut 4 is a higher stiffness between the main crossmember 2 and the auxiliary crossmember 3, and also support of the auxiliary crossmember 3 without additional supports on a longitudinal member of the auxiliary crossmember 3.

FIG. 12A-FIG. 12E show a further design variant. Fundamentally, the same characteristics are present as also illustrated in FIG. 2A-FIG. 2F 2. Here, however, as an addition to FIG. 2A-FIG. 2F 2, a plurality of trigger beads 26 are formed in a central portion of the main crossmember 2 in the front wall 25. The trigger beads 26 serve to produce an initial deformation of only one side of the bumper arrangement 1 in the case of a corresponding impact. The trigger beads 26 are formed by indenting the main crossmember 2. The front wall 25 is indented in this region, such that the connecting webs 28 of the two-chamber hollow profile illustrated here are compressed. There is thus a smaller depth 29 in the motor vehicle X direction with respect to the depth 30 of the main crossmember 2, and said main crossmember 2 is produced, for example, in the form of a strand profile. This is also apparent again in FIG. 12B and FIG. 12E.

Three trigger beads 26 are arranged in this case. One is arranged centrally in the middle in the motor vehicle transverse direction Y. The two other trigger beads are arranged adjacent thereto. The distance 31 of the trigger beads 26 from one another less than 10%, or less than 5%, of the total length 32 of the main crossmember 2 in the motor vehicle transverse direction Y.

As a modification to FIG. 12A-FIG. 12E, FIG. 13A-FIG. 13F shows a central trigger bead 26 on the front wall 25 of the main crossmember 2. A further trigger bead 26 is also arranged on the rear wall 33 of the main crossmember 2. Here, the trigger bead 26 is wider and has a width 34 of between 1 and 10% of the total length of the main crossmember 2. Here, the respective trigger beads 26 on the front and rear side of the main crossmember 2 are also produced by corresponding indentations. Here, too, the connecting webs 28 are again correspondingly formed.

FIG. 14A-FIG. 14E show a further design variant of the bumper arrangement 1 according to the disclosure. Here, in each case two trigger beads 26 which are spaced apart from one another are formed on the main crossmember 2 on the front wall. This forming is effected by an indentation. The two trigger beads 26 are spaced apart by a distance 35 which corresponds to 10 to 30% of the total length 32 of the main crossmember 2. The two trigger beads 26 are spaced apart from one another symmetrically from a central longitudinal plane of the main crossmember 2.

FIG. 15-FIG. 15E shows a fastening possibility which is able to be applied to all the bumper arrangements 1 mentioned above.

Here, the crash box 7 is formed in such a way that it overlaps the top side 36 on a top side 36, and also the main crossmember 2 on an underside 37. There is then a central bolt 38 or a fastening screw which engages through the main crossmember 2 to connect to the crash box 7. For the overlapping, corresponding extensions or tongues 39 are provided, by means of which the crash box 7 overlaps the main crossmember 2. This is illustrated in the sectional view B-B in FIG. 15E. The auxiliary crossmember 3 also has a stiffening web protruding toward the rear. This stiffening web simultaneously serves for the coupling to an additional crash box 7. Here, too, a bolt 38 is provided, which engages through the stiffening web and thus connects the auxiliary crossmember 3 to the additional crash box 12.

FIG. 16A-FIG. 16F show a further design variant. Said design variant corresponds substantially to the design variant according to FIG. 11A-FIG. 11D. Here, the respective vertical strut 4 is also formed with a front wall 21 and a rear wall 22. These are welded together at the joint point 24. Here, however, the vertical strut 4 is arranged such that a towing eye 19 engages through the front wall and the rear wall of the vertical strut 4. As per the section line in FIG. 16E, the towing eye 19 is arranged below the main crossmember 2 and also below the crash box 7. In the event of a head-on crash, the towing eye 19 thus has no adverse effect on the crash performance of the main crossmember 2 or crash box 7.

FIG. 17A-FIG. 17C show an alternative design variant to the variant of FIG. 11A-FIG. 11D. Here, the bumper arrangement 1 is formed in such a way that the vertical struts 4, which connect the main crossmember 2 to the auxiliary crossmember 3 of the cross-sectional view in FIG. 17C, not only have a front web and limbs projecting therefrom, but have a wrapped or rolled form at least in the region of a limb. This results in a closed hollow profile 20 in cross section and, as a result, increased stiffness of the vertical strut 4.

The wrapped or rolled part 40 is able to be processed by forming. However, the wrapped or rolled part 40 is also able to additionally be coupled for example to the web or limb, for example, by adhesive bonding or welding. Overall, an increased stiffness of the vertical strut 4 is produced.

A further aspect of the disclosure is additionally also illustrated between the upper main crossmember 2 and the lower auxiliary crossmember 3, said further aspect being able to be transferred to all other exemplary embodiments. At least one additional vertical strut 41 is illustrated. This is also formed in one piece with the upper main crossmember 2 and the lower auxiliary crossmember 3 in a materially integral manner. Additional vertical struts 6 are also able to be formed between the main crossmember 2 and the auxiliary crossmember 3. This increases the stiffness.

Figure 18A:
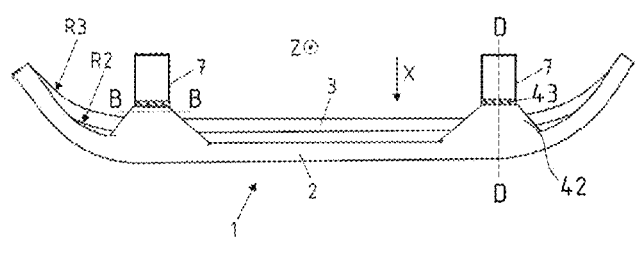
FIG. 18A and FIG. 18B show a fifteenth design variant in a plan view and a cross-sectional view according to the disclosure.
Figure 18B:
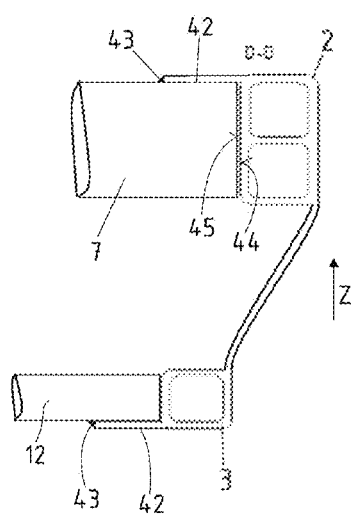

FIG. 18A and FIG. 18B show an alternative design variant as to how the crash boxes 7 are able to be coupled to the bumper arrangement 1. Here, in each case a front end face 44 of the crash box 7, and also of the additional crash support 12, is brought up to the rear wall 45 of the main crossmember 2. The same applies for the lower additional crash support 12, which is placed in a positively locking manner against the rear wall of the auxiliary crossmember 3. In order for these to now be coupled, a respective flange 42 is provided which projects the rear wall both of the main crossmember 2 and of the auxiliary crossmember 3 and in this respect overlaps the crash box 7 and the additional crash support 12, respectively. These are then coupled in a materially bonded manner by means of a weld, for example in the form of a fillet weld. In addition to the materially bonded coupling, this variant permits an additional positively locking coupling, such that the bumper arrangement 1 is retained in a positively locking manner in the motor vehicle vertical direction Z.

Figure 19A:
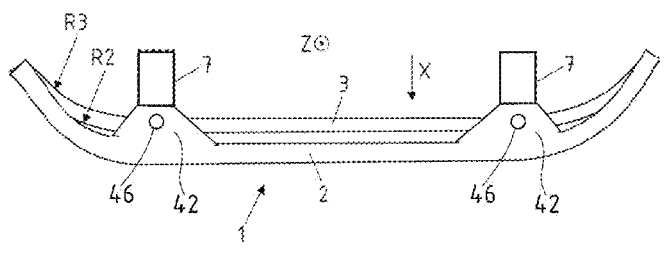
FIG. 19A and FIG. 19B show a sixteenth design variant in a plan view and a cross-sectional view according to the disclosure.
Figure 19B:
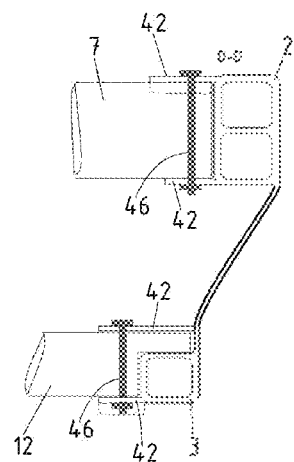

FIG. 19A and FIG. 19B show an analogous design variant in which, however, the coupling is not effected in a materially bonded manner by way of a weld, but is effected by way of a fastening bolt 46. Here, two flanges are also then provided in each case, said flanges overlapping the respective crash box 7 and, via the additional crash support 12, the auxiliary crossmember 3, respectively, or accommodating them in a fork-like manner.

FIG. 20A-FIG. 20C show a further design variant. Said design variant is analogous to FIG. 19A and FIG. 19B, having a respective fastening bolt 46 which accommodate the crash box 7 and the additional support, respectively. Here, however, a fork-like receptacle is additionally also illustrated in the motor vehicle transverse direction Y, as per FIG. 20B. The top side of the crash box 7 is overlapped by the flange. Furthermore, the flange also engages laterally around the crash box 7 by way of external limbs 47. The additional crash support 12 also has this feature. In addition, a part of said additional crash support overlaps the auxiliary crossmember 3 and the front end thereof is brought up to the front side of the auxiliary crossmember 3 in the motor vehicle longitudinal direction X.

The coupling possibilities respectively described in FIG. 18A and FIG. 18B, FIG. 19A and FIG. 19B, and FIG. 20A-FIG. 20C are able to be transferred to all the exemplary embodiments without departing from the scope of the disclosure in the process.

The foregoing description of some embodiments of the disclosure has been presented for purposes of illustration and description. The description is not intended to be exhaustive or to limit the disclosure to the precise form disclosed, and modifications and variations are possible in light of the above teachings. The specifically described embodiments explain the principles and practical applications to enable one ordinarily skilled in the art to utilize various embodiments and with various modifications as are suited to the particular use contemplated. Various changes, substitutions and alterations can be made hereto without departing from the spirit and scope of the disclosure.

The invention claimed is:

1. A bumper arrangement for a vehicle comprising:
   an upper main crossmember, wherein the upper main cross member is able to be coupled via crash boxes to the vehicle, and
   a lower auxiliary crossmember, wherein the upper main crossmember and the lower auxiliary crossmember are integrally connected together by a vertical strut,
   the upper main crossmember and the lower auxiliary crossmember extend in a vertical direction of the vehicle,
   the upper main crossmember and the lower auxiliary crossmember have different radii of curvature from one another, and
   the lower auxiliary crossmember is set back completely with respect to the upper main crossmember in a longitudinal direction of the vehicle, and
   the lower auxiliary crossmember further comprises longitudinal members, and the longitudinal members are able to support the lower auxiliary crossmember on the vehicle.

2. The bumper arrangement according to claim 1, wherein the upper main crossmember and the lower auxiliary crossmember are a press-formed component.

3. The bumper arrangement according to claim 1, wherein the upper main crossmember and the lower auxiliary crossmember together form an extruded profile.

4. The bumper arrangement according to claim 1, wherein the vertical strut is U-shaped in a cross section.

5. The bumper arrangement according to claim 1, wherein the upper main crossmember has an indentation configured to be initially deformed when a force or a load is applied to the vehicle in the longitudinal direction.

6. The bumper arrangement according to claim 1, wherein the lower auxiliary crossmember is able to be coupled to the crash boxes.

7. The bumper arrangement according to claim 1, wherein the upper main crossmember is supported on the lower auxiliary crossmember by a support element configured to support the upper main crossmember and the auxiliary crossmember on the crash boxes.

8. The bumper arrangement according to claim 7, wherein the integral component further comprises the support element.

9. The bumper arrangement according to claim 7, wherein the support element is on a side portion or a lower portion of the crash boxes.

10. The bumper arrangement according to claim 1, wherein a first outer end of the upper main cross member is coupled to a second outer end of the lower auxiliary cross member by the vertical strut, and the vertical strut is configured to support a front wheel of the vehicle in the longitudinal direction of the vehicle.

11. The bumper arrangement according to claim 1, wherein the vertical strut comprises a plurality of vertical struts that connect the upper main crossmember to the lower auxiliary crossmember.

12. The bumper arrangement according to claim 1, wherein each of the upper main crossmember and the lower auxiliary crossmember comprises a steel alloy.

13. The bumper arrangement according to claim 1, wherein each of the upper main crossmember and the lower auxiliary crossmember comprises a light metal alloy.

14. The bumper arrangement according to claim 1, wherein the vertical strut is C-shaped in a cross section.

15. The bumper arrangement according to claim 1, wherein the vertical strut is hat-shaped in a cross section.

16. A bumper arrangement for a vehicle comprising:
- an upper main crossmember, wherein the upper main cross member is able to be coupled via crash boxes to the vehicle, and
- a lower auxiliary crossmember, wherein the upper main crossmember and the lower auxiliary crossmember are integrally connected together by a vertical strut,
- the upper main crossmember and the lower auxiliary crossmember extend in a vertical direction of the vehicle,
- the upper main crossmember and the lower auxiliary crossmember have different radii of curvature from one another, and
- the lower auxiliary crossmember is set back with respect to the upper main crossmember in a longitudinal direction of the vehicle, and
- the lower auxiliary crossmember further comprises longitudinal members, and the longitudinal members are able to support the lower auxiliary crossmember on the vehicle,
- wherein the upper main crossmember and the lower auxiliary crossmember together form an extruded profile.

* * * * *